United States Patent [19]

Dearlove et al.

[11] 3,933,725
[45] Jan. 20, 1976

[54] PREPARATION OF ISOCYANATE TERMINATED PREPOLYMER

[75] Inventors: Thomas J. Dearlove, Troy; Gregory A. Campbell, Romeo; Richard P. Atkins, Royal Oak, all of Mich.

[73] Assignee: General Motors Corporation, Detroit, Mich.

[22] Filed: Sept. 26, 1974

[21] Appl. No.: 509,638

[52] U.S. Cl. .................... 260/33.6 UB; 260/75 NE; 260/77.5 AA
[51] Int. Cl.² .................... C08G 18/08; C08K 5/01
[58] Field of Search. 260/33.6 UB, 75 NE, 77.5 AA

[56] References Cited
UNITED STATES PATENTS

| | | | |
|---|---|---|---|
| 3,707,521 | 12/1972 | De Santis | 260/37 N |
| 3,711,445 | 1/1973 | Chu et al. | 260/37 N |
| 3,779,794 | 12/1973 | De Santis | 117/72 |

FOREIGN PATENTS OR APPLICATIONS

| | | |
|---|---|---|
| 1,242,866 | 8/1971 | United Kingdom |

*Primary Examiner*—Donald E. Czaja
*Assistant Examiner*—H. H. Fletcher
*Attorney, Agent, or Firm*—George A. Grove

[57] ABSTRACT

In accordance with a preferred embodiment of this invention, a polyether-type, isocyanate-terminated, polyurethane prepolymer is formed by (1) blending about one equivalent of diphenylmethane diisocyanate (hereinafter "MDI") and a mixture of from about 0.5 to about 0.55 equivalent of a polyoxypropylene diol having a molecular weight (Mn) within the range of about 1,000 to about 2,000, from about 0.08 to about 0.13 equivalent of a polyoxypropylene trio, having a molecular weight (Mn) in the range of from about 4,000 to about 4,500, and from about 10 to about 15 parts by weight of a hydrogenated terphenyl plasticizer per 100 parts by weight of the mixture of MDI and the polyols, (2) initiating the polymerization reaction by adding from about 0.08 to about 0.12 parts by weight of a tin catalyst per about 250 parts by weight of MDI; the catalyst being initially dissolved in from about 10 to about 15 parts by weight of additional hydrogenated terphenyl plasticizer per about 100 parts of the mixture of MDI and polyols. This process yields a thermally stable prepolymer, which is suitable for many applications, and the required reaction time may be as low as one minute. This represents a significant improvement over the prior art.

5 Claims, 2 Drawing Figures

PREPARATION OF ISOCYANATE TERMINATED PREPOLYMER

FIELD OF THE INVENTION

This invention relates to a novel process of forming an isocyanate-terminated, polyether-type, partially crosslinked, polyurethane prepolymer.

BACKGROUND OF THE INVENTION

In developing a method of producing polyurethane prepolymers, curable by atmospheric humidity, there are several important requirements which must be met if the new process is to be commercially feasible. First, a general preparatory method should have the flexibility of producing prepolymers with varying physical properties for various applications such as sealants, elastomers and foams. This flexibility is usually achieved by varying the molecular weights and weight ratios of the diols and triols. Second, it is preferable to form a prepolymer with a relatively high degree of conversion of isocyanate to urethane because this reduces the time required to cure the prepolymer. Third, for obvious economic reasons, the preparation should be fast and should not require expensive, special purpose equipment.

The prior art teaches several methods of forming moisture-curable, polyurethane prepolymers from diisocyanates, polyols and suitable catalysts. However, none of the techniques taught or suggested by the prior art meet all of the above goals.

In the past, developmental efforts have been directed at the problems of maintaining control of the polymerization reaction and of producing a uniform prepolymer. These problems were believed to be caused by the highly exothermic nature of the polymerization reaction and the positive temperature coefficient of the reaction rate constants. These factors indicate that the reaction may become autocatalytic.

Kinetically, the polymerization reaction is of the second order and, therefore, on a macroscale the rate of reaction is dependent on the degree of mixing. In addition, the polymerization is a very fast exothermic reaction and the contact between the reactants must be uniform throughout the batch to prevent the formation of undesirable gel particles. These are small beads which contain high molecular weight and/or a highly branched polymer and are formed when the stirring of the reacting mixture is not sufficient to maintain a uniform dispersion of the polymerizing reactive sites. If the highly branched polymer segments, having a multitude of reacting sites, are allowed to cluster and generate localized hot spots in which the rate of polymerization is very high, then they will develop into gel particles. The tendency to form gel particles is increased as the degree of molecular branching in the triol is increased, and can be significantly reduced by eliminating the triol. However, this causes a significant loss in the tensile strength and modulus of the cured prepolymer.

Prior to this invention, it was believed that the only reasonable approach to the problem created by the polymerization exotherm was to greatly reduce the rate of polymerization. In general, this was accomplished by either using a noncatalyzed prereaction step in which the isocyanate was slowly reacted with some of the polyol, usually the diol, or by omitting the triol completely, which would eliminate any crosslinking reactions.

The prior art teaches at least three specific techniques of managing this problem. First, there is a widely used two-step method; during the first step of this process the diisocyanate and a diol are mixed, without a catalyst, and reacted at about 180° F. until the mixture is free of hydroxyl (OH) groups and contains about 3.5% of unreacted or free isocyanate (NCO) groups. This reaction takes about three to four hours and, therefore, is a severe bottleneck in any production application. The second step of this reaction is to add a branched triol and a tin-based catalyst to the above reaction product, and stir vigorously. The polymerization reaction is then continued at about 140° F. until the free isocyanate (NCO) is reduced to about 1.3%; this step requires an additional 30 to 60 minutes. The prereaction serves to increase the viscosity of the subsequent polymerizing mixture and this physically slows the reaction by reducing the rate at which the reactive hydroxyl (OH) and isocyanate (NCO) functionality come into contact with each other.

In the second prior art approach, the problem is avoided by using only a linear diol and then stopping the catalyzed reaction at moderately low degrees of conversion, as indicated by the ratio of isocyanate (NCO) group to hydroxyl (OH) groups within the range of about 2:1 to about 4:1. Omitting the triol makes the prepolymer unsuitable for many applications, but this modification effectively controls the polymerization exotherm and reduces the required reaction time to about 30 minutes.

The third prior art technique of managing the problem is to form a prepolymer with a relatively low degree of conversion and then depend on the subsequent prepolymer curing reaction to complete the polymerization. In one specific method the ratio of isocyanate groups to hydroxyl group in the prepolymer is in the range of about 4:1 to about 10:1. The subsequent curing step is a time consuming process.

OBJECT OF THE INVENTION

It is an object of this invention to provide a method forming a partially crosslinked and externally plasticized, polyether-type, polyurethane prepolymer having an isocyanate to hydroxyl ratio in the range of 1.4:1 to 1.5:1, a Brookfield viscosity at 25° C. in the range of 8,000 to 500,000 cp, and a molecular weight ($\overline{M}n$) in the range of 12,000 to 25,000, said method requiring a reaction time of less than three minutes.

SUMMARY OF THE INVENTION

In accordance with a preferred embodiment of this invention, about 250 parts by weight of MDI, about 1,050 parts by weight of a linear polyoxypropylene diol, having a molecular weight ($\overline{M}n$) of about 2,000, and about 285 parts by weight of a polyoxypropylene triol, having a molecular weight ($\overline{M}n$) of about 4,100, are blended at about 45° C. until they are dissolved. No significant polymerization occurs at this stage of the process. During this initial blending operation about 200 parts by weight of a compatible, nonreactive plasticizer is added; a preferred plasticizer is a mixture of hydrogenated terphenyl compounds marketed by Monsanto under the designation "HB-40".

Once the isocyanate and the polyol are dissolved, about 0.1 part of stannous octoate, which has been previously dispersed in about 200 parts by weight of additional plasticizer is then added to the solution and the stirring is continued. However, the extremely vigorous stirring required by the prior art methods to prevent gel formation is not necessary because the polyols and the MDI are already uniformly blended and the catalyst carrier quickly and uniformly disperses the catalyst throughout the mixture.

The catalyst initiates the polymerization reaction which is then continued until all available hydroxyl groups (OH) have been reacted and the free isocyanate content is reduced to a level of about 1.4% by weight based on the total composition; this represents a degree of conversion of up to 80%. The Brookfield viscosity at 25° C. for this prepolymer is about 36,000. Typically, this takes from about one to about three minutes (see FIGS. 1 and 2). Surprisingly, there are no problems caused by the exotherm, which in localized areas, could lead to gel formation or, which on a larger scale, could significantly raise the overall temperature of reacting mixture and lead to the undesirable products of the allophanate and biuret reactions. Heat is produced but it does not present the problems which were anticipated. This unexpected development allows the direct addition of a catalyst, dissolved in a suitable carrier, to the isocyanate-polyol solution.

To produce a prepolymer preferable for sealant applications the diol should have a molecular weight ($\overline{M}n$) in the range of about 1,000 to about 2,000, the triols should have a molecular weight ($\overline{M}n$) within the range of about 4,000 to about 4,500. Within this range of molecular weights and the relative amounts specified above for the polyol ingredients, there is no significant polymerization during the initial blending operation. In addition, the prepolymer, so prepared, has acceptable creep characteristics for vertical sealant applications, and the tensile strength and modulus of the resulting sealant is acceptable in applications such as automotive windshields.

The novel process described above offers the following advantages over the prior art techniques. First, the subject process can produce a prepolymer which has the improved tensile strength and sag characteristics required for sealant applications by using a mixture of diols and triols in the polymerization reaction. Second, the prepolymer produced by this process has a high degree of conversion from isocyanate to urethane and, therefore, requires a shorter cure time to acquire the desired polymer properties; this is a significant advantage in mass production operations. Third, this novel process does not require extreme agitation and can be carried out in conventional mixing apparatus having straight-walled reaction vessels and blade stirrers. Finally, the major advantage to this novel process is that a prepolymer having these advantages is formed in an extremely short reaction time of from about one to about three minutes when compared to other processes which require up to about four or five hours.

As stated above, a two-step process is often used for preparing polyurethane prepolymers. However, the first step of the two-step process in which the diol is prereacted with the isocyanate requires from three to four hours. This uncatalyzed prereacting step was believed necessary to prevent gel formation and achieved the desired physical properties. Even though the reaction time could have been greatly reduced by the use of a catalyst, one was not used in this prereacting step because it was feared that it would promote the formation of gel particles. This two-step process is a standard textbook method which is geared to the prior art's concern for the exotherm generated by a rapid polymerization reaction and to the efforts to slow this reaction to a controllable rate.

At first glance the second prior art process mentioned above appears to be very similar to the subject process in that the polyol and the isocyanate are directly mixed. However, a closer look at the limitations shows that this prior art method completely omits the triols which greatly contribute to the physical properties of the polymer prepared from the prepolymer. By using only a relatively high molecular weight linear diol, the problems of gelation are greatly reduced because the total number of reacting sites is greatly reduced in respect to the mass of the reactants. In addition, the omission of the triol prevents the formation of any crosslinks. Finally, this prior art technique provides a moderately low degree of polymerization and yields a prepolymer with a relatively high percent free isocyanate; in this respect the second and third prior art methods are very similar. Comparatively, the subject process is faster, requires lower reaction temperatures to yield stable partially crosslinked prepolymer with conversions of isocyanate to urethane as high as 80% or more.

These and other advantages of our invention will be more easily understood in view of a detailed description thereof to include specific examples.

In this description, reference will be made to the drawings, in which:

FIG. 1 is a plot of the molecular weight ($\overline{M}w$) of an MDI based prepolymer as a function of the polymerization reaction time. The initial formulation and the final prepolymer data are also given, and FIG. 2 is a plot of the molecular weight ($\overline{M}w$) of a TDI based prepolymer as a function of the polymerization reaction time; the initial formulation and the final prepolymer data are also given.

DETAILED DESCRIPTION OF THE INVENTION

Figure 1:
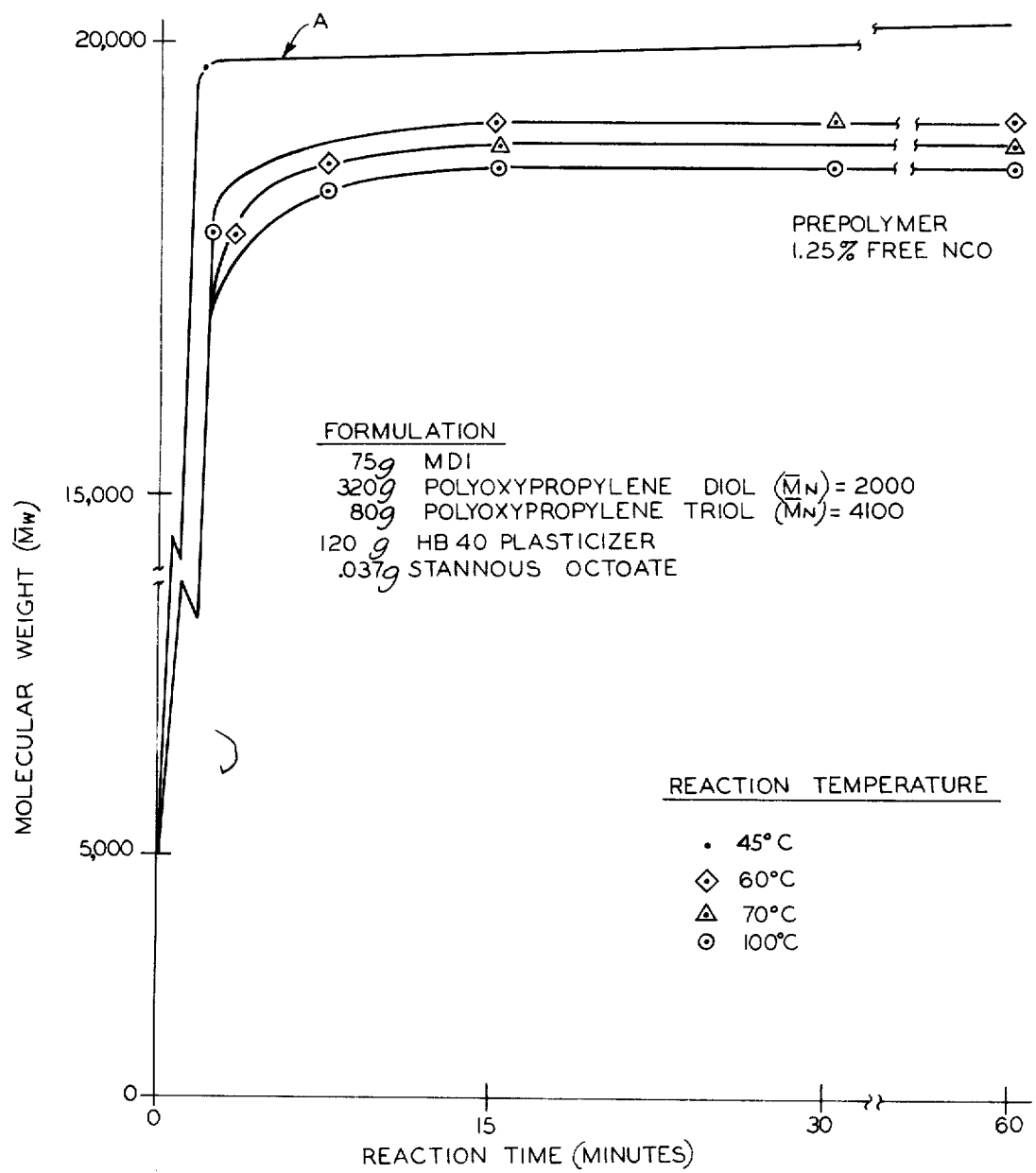

In accordance with our invention it is possible to form a thermally stable, polyether-type, isocyanate-terminated, polyurethane prepolymer within a period of from about one to about 3 minutes. The prepolymer so formed is partially crosslinked and has a high degree of conversion from isocyanate to urethane which minimizes the time required for it to cure and form a polyurethane resin; this prepolymer also typically contains a nonreactive external plasticizer, such as the aforementioned HB-40, or a phthalate (e.g., dioctylphthalate), a sebacate, a stearate, a chlorinated parafin, an adipate or a halogenated biphenyl.

The subject prepolymer may be characterized as (1) having a viscosity in the range of from about 8,000 to about 500,000 cp, preferably from 25,000 to 50,000 cp, if plasticized with from about 10% to about 30% by weight based on the total composition of suitable plasticizer, (2) a molecular weight ($\overline{M}w$) in the range of from about 12,000 to about 25,000, preferably 15,000 to 22,000, and (3) a free isocyanate content in the range of from about 0.5% to about 10% by weight based on the total composition including plasticizer preferably from 1.2% to 1.8%.

In accordance with this invention, about 1.0 equivalent (125 weight parts) of MDI is mixed with and dissolved in, at a temperature in the range of 40° C. to 100° C., from about 0.37 to about 0.6 equivalent of a polyoxypropylene diol having a molecular weight ($\overline{M}n$)

in the range of from about 200 to about 2,200 (1 equivalent equals the molecular weight ($\overline{M}n$) divided by 2 in weight parts), (2) from about 0.05 to about 0.27 equivalent of a polyoxypropylene triol having a molecular weight ($\overline{M}n$) in the range of from about 700 to about 4,500 (1 equivalent equals the molecular weight ($\overline{M}n$) divided by 3 in weight parts), and (3) from 5% to 15% by weight based on the total composition of a suitable plasticizer or solvent. There is no catalyst added in this initial blending step and there is surprisingly no significant degree of polymerization. Therefore, there is no need for elaborate mixing equipment or careful and lengthy ingredient-addition procedures.

Once the above ingredients are dissolved, from 0.05 to 0.4 weight part of a tin catalyst is dissolved in from 5% to 15% by weight based on the total composition of a suitable carrier, such as a plasticizer or an inert solvent, and this catalyst solution is blended into the polyol-diisocyanate solution. Since the catalyst is dispersed in a carrier, it may be quickly added to and dispersed throughout the solution. This step initiates the polymerization reaction and it is continued until all available hydroxyl groups (OH) are reacted and the prepolymer has a free isocyanate content in the suitable range of from about 0.5% to about 10% by weight based on the total composition. Usually this takes less than about three minutes (see Examples 1 and 2) which represents a significant improvement over the prior art techniques requiring anywhere from about thirty minutes to about five hours or more.

In the practice of this invention, if the molecular weight ($\overline{M}n$) of the diol is much below about 700 or if the molecular weight ($\overline{M}n$) of the triol is much below about 1,500, there is a higher concentration of reactive (OH) groups and, therefore, a higher number of urethane-forming, exothermic polymerization reactions. Consequently, there is an observed prereaction prior to the addition of the catalyst and a greater overall exotherm which causes difficulty in controlling the temperature of the batch. If the molecular weight ($\overline{M}n$) of the diol is much greater than the specified 2,200, or if the molecular weight ($\overline{M}n$) of the triol is much greater than the specified 4,500, then the ultimate polyurethane resin does not have the physical properties required for most applications, such as sealants and the like. Regarding the catalyst concentration, it has been learned that 0.05 weight part of a tin based urethane-polymerization catalyst per equivalent of the diisocyanate is about the minimum level which will provide the desired reaction times. Conversely, if this concentration exceeds 0.4, the reaction becomes difficult to control and upon aging at elevated temperatures, the prepolymer will thicken because of undesirable allophanate and biuret side reactions. This latter effect may be evident at concentrations as low as 0.2 with certain catalysts, especially stannous octoate.

The subject process may also be used to form a prepolymer from toluene diisocyanate (hereinafter "TDI"). In accordance with this embodiment 1.0 equivalent of TDI is mixed with, and dissolved in, (1) from about 0.5 to 0.55 equivalent of a polyoxypropylene diol having a molecular weight ($\overline{M}n$) in the range of from about 1,000 to 2,000, and (2) from about 0.08 to 0.13 equivalent of a polyoxypropylene triol having a molecular weight ($\overline{M}n$) in the range of from about 1,500 to 4,100, and (3) from 5% to 15% by weight based on the total composition of a suitable nonreactive plasticizer, such as HB-40, or any high boiling, nonreactive and compatible plasticizer typically used in poly(vinyl chloride) resins, such as those described above.

Once the above ingredients are dissolved and as stirring is continued, from 0.05 to 0.4 weight parts of stannous octoate, which has been previously dissolved in from 5% to 15% by weight based on the total composition of additional plasticizer, are added and the stirring continued. This initiates the polymerization reaction which continues until all available hydroxyl groups are reacted and the prepolymer has a Brookfield viscosity at 25° C within the range of from 8,000 to 500,000, preferably from 8,000 to 40,000, and a free isocyanate content in the suitable range of from about 1.0% to 10%, preferably from 1.2% to 1.8%, by weight based on the total composition and a molecular weight ($\overline{M}w$) in the range of from 14,000 to 22,000. Typically, this is accomplished in from 1.5 to 2.5 minutes which represents a significant improvement over the prior art techniques requiring anywhere from thirty minutes to about 5 hours or more. (See Example 3 and FIG. 2).

EXAMPLE 1

This example is included to describe the precise steps used in the preparation of the subject prepolymer and to illustrate the properties of that prepolymer, which in this case is a suitable material for use in polyurethane sealant applications.

The first step was to thoroughly blend at 45° C. (1) 250 grams of MDI, (2) 1,050 grams of a polyoxypropylene diol having a molecular weight ($\overline{M}n$) of about 2,000, (3) 285 grams of a polyoxypropylene triol having a molecular weight ($\overline{M}n$) of about 4,100, and (4) 200 grams of a hydrogenated terphenyl plasticizer, HB-40. There was no observable chemical reaction during this blending operation and about three to about five minutes were required to achieve a uniform dispersion. Conventional mixing equipment consisting of a smooth-walled reaction vessel and a blade stirrer revolving about 200 rpm was used.

Once the polyols, the MDI and the plasticizer were dissolved, about 0.107 grams by weight of stannous octoate, which had been dissolved in an additional 200 grams of a hydrogenated terphenyl plasticizer, HB-40, were added to the isocyanate-polyol mixture, and the stirring was continued. Samples were taken out at intervals of 1, 7.5, 15, 30 and 60 minutes, quenched in an excess of methanol and their molecular weights determined by gel permeation chromatography. This data was then plotted as a function of reaction time in FIG. 1 on curve A. This curve illustrates that the polymerization reaction is essentially complete within the first 2 and one-half minutes, which is many times shorter than any prior art technique for forming a similar prepolymer. The procedure was then repeated with the blending and reaction temperatures raised to 60° C., 70° C. and, finally, 100° C., and the molecular weight curves for each of those reactions as a function of time are also plotted on FIG. 1. The isocyanate to hydroxyl equivalent ratio (NCO/OH) for this prepolymer was about 1.3. Similar results were obtained and the polymerization reactions were all complete within 2 and one-half minutes or less. The prepolymers made in this series all had a Brookfield viscosity at 25° C. of 33,000 and a free isocyanate content of 1.25% based on the total composition.

This group of curves shows the stability of the subject prepolymer even at elevated temperatures once all the available hydroxyl groups have been reacted. It is evident from FIG. 1 that no polymerization or depolymerization reactions occurred once the prepolymer was formed even at temperatures as high as 100° C. This indicates relatively long shelf life, which is very desirable. This figure also illustrates the flexibility in reaction temperatures provided by this technique.

EXAMPLE 2

Using the methods described in Example 1, a series of MDI prepolymers were prepared at a reaction temperature of about 45° C. Table I lists the composition, the degree of conversion, the free isocyanate content and the Brookfield viscosity at 25° C. of these materials. In each formulation the average molecular weight ($\overline{M}n$) of the triol was about 4,100 and that of the diol was 2,000 except in formulation 7 where the molecular weight ($\overline{M}n$) of the diol was 700.

($\overline{M}n$) of about 2,000 and a branched polyoxypropylene triol having a molecular weight ($\overline{M}n$) of about 4,100.

More specifically, 250 parts by weight of the MDI are blended with from 1,000 to 1,100 parts of the diol and from 220 to 350 parts of the triol. In addition, this initial solution also contains 190 to 210 parts by weight of a mixture of hydrogenated terphenyl compounds, HB-40. To this solution from 0.08 to 0.12 part by weight of tin catalyst, which has been initially dissolved in an additional 190 to 210 parts of the plasticizer, are then added to initiate the polymerization reaction. Stirring is continued and the reaction allowed to progress until all available hydroxyl groups (OH) are reacted and the desired free isocyanate content within the range of about 0.2% to about 1.8% is achieved. This typically requires from one to three minutes. The prepolymer prepared in this fashion is particularly suited for sealant applications because of its stability, creep

TABLE I

| | MDI (Grams) | Diols[4] (Grams) | Triols[5] (Grams) | Plasticizer (Grams) | Percent Conversion | Initial Free NCO (%) | Final Free NCO (%) | Catalyst[3] | Brookfield Viscosity at 25° C. (cps) |
|---|---|---|---|---|---|---|---|---|---|
| 1. | 50. | 195.8 | 72.8 | 80.4 | 66 | 4.1 | 1.4 | T-9[1] | 40,800 |
| 2. | 75. | 315.4 | 86.6 | 120 | 66 | 4.1 | 1.4 | T-1[2] | 36,800 |
| 3. | 75. | 317.6 | 79.4 | 120 | 66 | 4.1 | 1.4 | T-9 | 28,800 |
| 4. | 74.3 | 317.6 | 79.4 | 120 | 75.9 | 4.1 | 1.0 | T-9 | 60,800 |
| 5. | 62.6 | 317.6 | 79.4 | 120 | 81.8 | 3.56 | 0.56 | T-9 | 180,000 |
| 6. | 57.7 | 320. | 80. | 120 | 85 | 3.31 | 0.50 | T-9 | 850,000 |
| 7. | 144.8 | 317.2 | 79.3 | 120 | 80 | 7.0 | 1.4 | T-9 | 1 × 10⁶ |

[1] - T-9 is stannous octoate.
[2] - T-1 is dibutyl tin diacetate.
[3] - Catalyst concentration is 0.0063%.
[4] - ($\overline{M}n$) of diol is about 2,000 except no. 7 in which the diol Mn is 700.
[5] - ($\overline{M}n$) of triol is about 4100.

EXAMPLE 3

Figure 2:
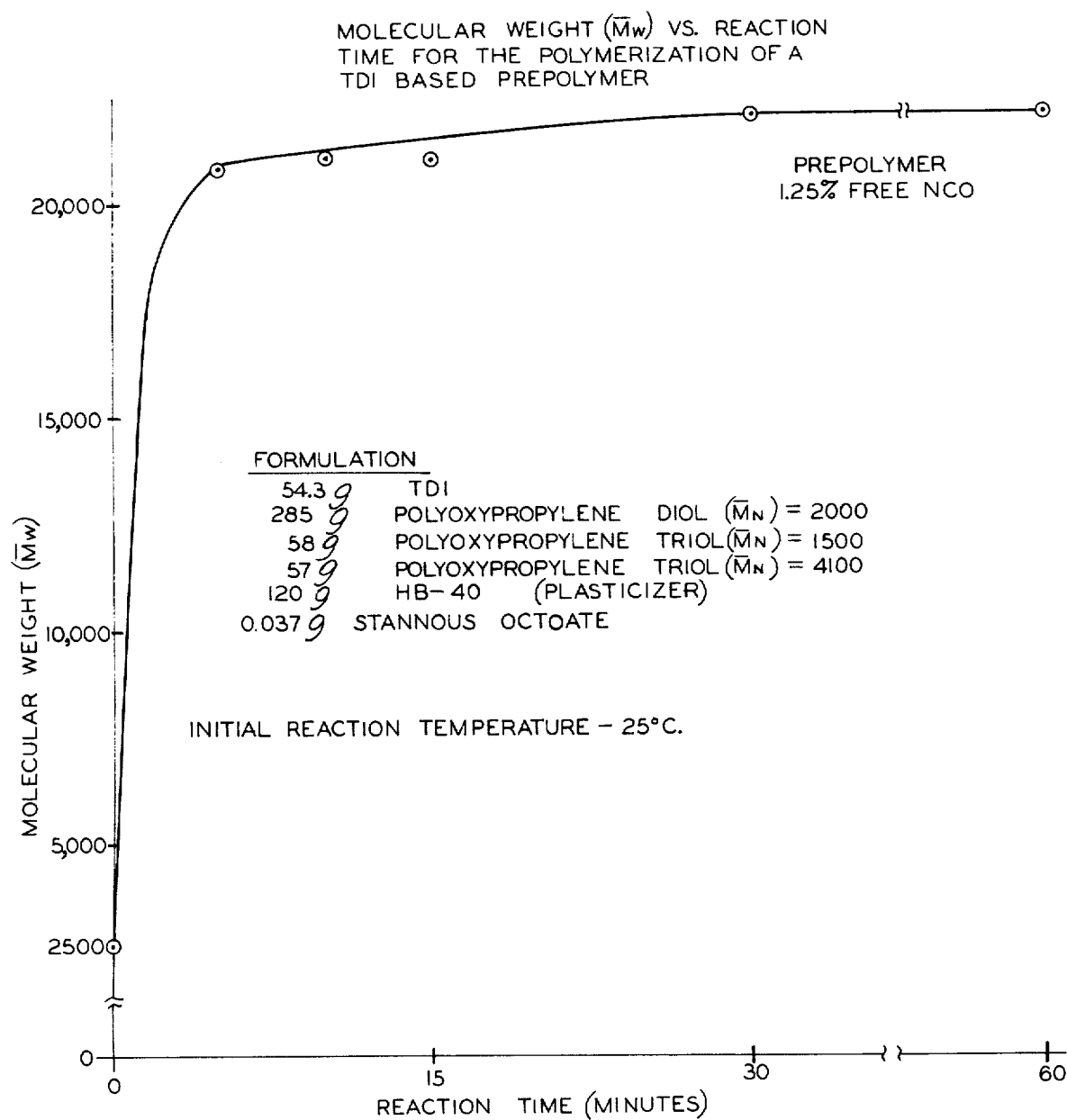

Using the methods described in Example 1 and blending all ingredients at room temperature, a series of prepolymers were formed from TDI. Table II lists the composition, degree of conversion, free isocyanate content, and the Brookfield viscosity at 25° C. of these prepolymers. Stannous octoate was the catalyst used in each formulation. As shown in FIG. 2, this reaction is essentially completed within two and one-half minutes.

Using TDI, the physical properties of the prepolymer are within the suitable limits defined in this specification.

properties and lack of gel particles.

A prepolymer may be prepared in accordance with the practice of this invention having (1) a free isocyanate content within the range of about 0.5% to about 10% by weight, (2) an isocyanate to hydroxyl ratio in the range of about 1.15 to about 1.8, (3) a Brookfield viscosity at 25° C. in the range of about 8,000 to about 500,000 cp., and (4) a molecular weight (Mw) n the range of about 10,000 to about 40,000. These prepolymers may be curable by atmospheric humidity, amines or other suitable curing agents to form useful sealants, elastomers and foams.

A suitable prepolymer may be prepared by mixing at a suitable temperature about 1 equivalent of MDI or

TABLE II

| TDI (Grams) | Plasticizer HB-40 (Grams) | Polyoxypropylene Diol | | Polyoxypropylene Triol | | % Free NCO | Degree of Conversion (%) | Brookfield Viscosity |
|---|---|---|---|---|---|---|---|---|
| | | $\overline{M}n = 1000$ | $\overline{M}n = 2000$ | $\overline{M}n = 1500$ | $\overline{M}n = 4100$ | | | |
| 46.5 | 120 | — | 320. | — | 80 | 1.0 | 73 | 20,000 |
| 48.5 | 112 | — | 200 | — | 200 | 1.4 | 65 | 10,000 |
| 54.4 | 114 | — | 333.0 | 66.6 | — | 1.1 | 76 | 56,000 |
| 86.3 | 122 | 333.3 | — | 66.6 | — | 1.4 | 79 | 120,000 |
| 84.3 | 121 | 300 | — | 100 | — | 1.27 | 81 | 290,000 |
| 51.3 | 120 | — | 285 | 57 | 58 | 1.0 | 77 | 64,000 |

In accordance with a preferred practice of this invention, a polyurethane prepolymer, curable by atmospheric humidity, having a Brookfield viscosity at 25° C. in the range of 25,000 to 50,000 cp. and a molecular weight ($\overline{M}w$) in the range of 15,000 to 25,000 and a free isocyanate content in the range of 1.2% to 1.8% by weight based upon the total composition is produced. The process comprises first blending MDI with both a linear polyoxypropylene diol having a molecular weight TDI to include linear dimers, trimers and oligomers and from about 0.37 to about 0.6 equivalent of a polyoxypropylene diol having a molecular weight ($\overline{M}n$) in the range of about 200 to about 2,500, and from about 0.05 to about 0.27 equivalent of a polyoxypropylene triol having a molecular weight ($\overline{M}n$) in the range of about 700 to about 4,500.

If MDI is used, the mixing temperature must be above 40° C. as below that point MDI is a solid, and if the temperature exceeds 100° C. for reactions involving either diisocyanate, undesirable biuret and allophanate reactions begin to occur. If the molecular weights of the polyols exceed the prescribed limits, the tensile strength and modulus of the cured polymer are significantly reduced; and if the molecular weights fall below the prescribed limits, the polymerization during this initial dissolution step becomes significant and the process loses its advantages.

To this initial blend, 5% to 15% by weight based on the total composition of a suitable plasticizer, which may be any nonreactive compatible plasticizer, may be added. Typically, materials which meet the above requirements and those which are effective plasticizers for poly(vinyl chloride) will be suitable in this application. Once a uniform dispersion is achieved and as the stirring continues, from about 0.05 to 0.4 weight part catalyst is added. Before the catalyst is added, it is dissolved in a suitable catalyst carrier, which may be a plasticizer or a nonreactive compatible solvent. The carrier should constitute from about 5% to about 15% by weight of the total reactants. Examples of suitable catalysts include dibutyl tin dilaurate and dibutyl tin diacetate and the like.

The polymerization reaction continues until all available hydroxyl groups (OH) are reacted and the desired free isocyanate content, which suitably falls within the range of about 0.5% to about 10%, is achieved.

While our invention has been described in terms of certain specific embodiments, it will be appreciated that other forms thereof could readily be adapted by one skilled in the art. Therefore, the scope of our invention is not to be limited to the specific embodiments disclosed.

What is claimed is:

1. An improved process of forming a partially cross-linked, plasticized, polyurethane moisture curable sealant prepolymer having an isocyanate to hydroxyl equivalent ratio in the range of about 1.4:1 to about 1.5:1, a free isocyanate content in the range of about 1.2% to about 1.8% by weight based on the total prepolymer composition, a Brookfield viscosity at 25° C. in the range of about 25,000 to about 100,000 cp., and a molecular weight ($\overline{M}w$) in the range of about 15,000 to about 25,000, comprising:
   a. stirring together until uniformly blended at a temperature in the range of from about 40° C. to about 100° C.:
      1. about 1 equivalent of a diisocyanate selected from the group consisting of toluene diisocyanate and diphenyl methane diisocyanate,
      2. about 0.50 to about 0.55 equivalent of a dihydroxy terminated polyoxypropylene, having a molecular weight ($\overline{M}n$) in the range of about 1,000 to about 2,000,
      3. about 0.08 to about 0.13 equivalent of a polypropylene ether triol, having a molecular weight ($\overline{M}n$) in the range of from about 1,500 to about 4,500, and
      4. about 5% to 15% by weight based on the total composition of a plasticizer that is miscible and compatible with said diisocyanate and said polyols, until a solution is achieved, and then as said solution is being stirred,
   b. catalyzing the polymerization reaction of said diisocyanate and said polyols to form said prepolymer by mixing into said solution a solution comprising from about 0.08 to about 0.12 weight parts per each 250 weight parts of said diisocyanate of a tin-based urethane polymerization catalyst dissolved in about 5% to about 10% by weight based on the total composition of additional plasticizer, and
   c. continuing to stir said reacting mixture for a period of minutes to maintain a relatively uniform distribution of reacting species until the free isocyanate content of said solution is within the range of from about 1.2% to about 1.8% by weight based on the total composition, thereby forming said prepolymer substantially free of gel particles.

2. An improved process of forming a partially cross-linked, plasticized, polyurethane moisture curable sealant prepolymer having an isocyanate to hydroxyl equivalent ratio in the range of about 1.4:1 to about 1.5:1, a free isocyanate content in the range of about 1.2% to about 1.8% by weight based on the total prepolymer composition, a Brookfield viscosity at 25° C. in the range of about 25,000 to about 50,000 cp., and a molecular weight ($\overline{M}w$) in the range of about 15,000 to about 25,000, comprising:
   a. stirring together until uniformly blended at a temperature in the range of from about 40° C. to about 100° C.:
      1. about 250 weight parts of diphenyl methane diisocyanate,
      2. about 1,000 to about 1,100 weight parts of a dihydroxy terminated polyoxypropylene, having a molecular weight ($\overline{M}n$) in the range of about 1,000 to about 2,000,
      3. about 220 to about 350 weight parts of a polypropylene ether triol, having a molecular weight ($\overline{M}n$) in the range of from about 4,000 to about 4,500, and
      4. about 190 to about 210 parts of a hydrogenated terphenyl plasticizer until a solution is achieved, and then as said solution is being stirred,
   b. catalyzing the polymerization reaction of said diisocyanate and said polyols to form said prepolymer by mixing into said solution a solution comprising from about 0.08 to about 0.12 weight parts of a tin urethane polymerization catalyst dissolved in about 190 to about 210 weight parts of a hydrogenated terphenyl plasticizer, and
   c. continuing to stir said reacting mixture for a period of minutes to maintain a relatively uniform distribution of reacting species until the free isocyanate content of said solution is within the range of from about 1.2% to about 1.8% by weight based on the total composition, thereby forming said sealant prepolymer substantially free of gel particles.

3. An improved process of forming a partially cross-linked, externally plasticized, polyether-type polyurethane prepolymer which is substantially gel free having an isocyanate to hydroxyl equivalent ratio in the range of about 1.15 to about 1.8, a free isocyanate content in the range of about 0.5% to about 10% by weight based on the total prepolymer composition, a viscosity in the range of about 15,000 to about 500,000 cp., and a molecular weight ($\overline{M}w$) in the range of about 10,000 to about 40,000, said prepolymer being curable by atmospheric humidity, comprising:
   a. uniformly blending at a temperature within the range of from about 40° C. to about 100° C.:
      1. about 250 weight parts of diphenyl methane diisocyanate,
      2. about 730 to about 1,200 weight parts of a dihydroxy terminated polyoxypropylene diol, having a molecular weight ($\overline{M}n$) in the range of about 200 to about 2,200,
3. about 140 to about 730 weight parts of a polypropylene ether triol, having a molecular weight ($\overline{M}n$) in the range of from about 700 to about 4,500, and
4. about 5% to about 15% by weight based on the total composition of a plasticizer which is miscible and compatible with said diisocyanate and said polyols until a solution is achieved, and then as said solution is being stirred, b. catalyzing the polymerization reaction of said diisocyanate and said polyols to form said prepolymer by mixing into said dispersion a solution comprising from about 0.1 to about 0.4 weight parts of a tin catalyst and from about 5% to about 15% by weight based on the total composition weight parts of additional plasticizer, and c. stirring said reacting mixture to maintain a relatively uniform distribution of reacting species until the free isocyanate content of said mixture is within the range of from about 0.5% to 10% by weight based on the total composition.

4. An improved process of forming a partially crosslinked, plasticized, polyurethane moisture curable sealant prepolymer having an isocyanate to hydroxyl equivalent ratio in the range of about 1.4:1 to about 1.5:1, a free isocyanate content in the range of about 1.2% to about 1.8% by weight based on the total prepolymer composition, a Brookfield viscosity at 25° C. in the range of about 8,000 to about 40,000 cp., and a molecular weight ($\overline{M}w$) in the range of about 14,000 to about 22,000, comprising:

a. stirring together until uniformly blended at room temperature:
  1. about 250 weight parts of toluene diisocyanate,
  2. about 1,000 to about 1,100 weight parts of a dihydroxy terminated polyoxypropylene, having a molecular weight ($\overline{M}n$) in the range of about 1,000 to about 2,000,
  3. about 220 to about 350 weight parts of a polypropylene ether triol, having a molecular weight ($\overline{M}n$) in the range of from about 4,000 to about 4,500, and
  4. about 190 to about 210 parts of a hydrogenated terphenyl plasticizer until a solution is achieved, and then as said solution is being stirred, b. catalyzing the polymerization reaction of said toluene diisocyanate and said polyols to form said prepolymer by mixing into said solution a solution comprising from about 0.08 to about 0.12 weight parts of a tin-based, urethane-polymerization catalyst dissolved in about 190 to about 210 weight parts of a hydrogenated terphenyl plasticizer, and c. continuing to stir said reacting mixture for a period of minutes to maintain a relatively uniform distribution of reacting species until the free isocyanate content of said solution is within the range of from about 1.2% to about 1.8% by weight based on the total composition, thereby forming said sealant prepolymer substantially free of gel particles.

5. An improved process of forming a partially crosslinked, plasticized, polyurethane moisture curable sealant prepolymer having an isocyanate to hydroxyl equivalent ratio in the range of about 1.15:1 to about 1.8:1, a free isocyanate content in the range of about 0.5% to about 10% by weight based on the total prepolymer composition, a Brookfield viscosity at 25° C. in the range of about 8,000 to about 500,000 cp., and a molecular weight ($\overline{M}w$) in the range of about 8,000 to about 40,000, comprising:

a. stirring together until uniformly blended at a temperature in the range of from about 40° C. to about 80° C.:
  1. about 1.0 equivalent of toluene diisocyanate,
  2. about 0.37 to about 0.6 equivalent of a dihydroxy terminated polyoxypropylene, having a molecular weight ($\overline{M}n$) in the range of about 1,000 to about 2,000,
  3. about 0.05 to about 0.27 equivalent of a polypropylene ether triol, having a molecular weight ($\overline{M}n$) in the range of from about 700 to about 4,500, and
  4. about 5% to about 15% by weight based on the total composition of a plasticizer which is miscible and compatible with said diisocyanate and said polyols until a solution is achieved, and then as said solution is being stirred, b. catalyzing the polymerization reaction of said toluene diisocyanate and said polyols to form said prepolymer by mixing into said solution a solution comprising from about 0.05 to about 0.4 weight parts per 250 weight parts of diisocyanate of a tin-based, urethane polymerization catalyst dissolved in about 5% to about 15% by weight based on the total composition parts of additional plasticizer, and c. continuing to stir said reacting mixture for a period of minutes to maintain a relatively uniform distribution of reacting species until the free isocyanate content of said solution is within the range of from about 0.5% to about 10% by weight based on the total composition, thereby forming said sealant prepolymer substantially free of gel particles.

* * * * *